United States Patent
Fernihough et al.

(10) Patent No.: US 8,493,815 B2
(45) Date of Patent: *Jul. 23, 2013

(54) STREAMER CABLE WITH ENHANCED PROPERTIES

(75) Inventors: Robert A. P. Fernihough, Gloucestershire (GB); William G. Kikendall, San Diego, CA (US); Phillip R. Goines, Katy, TX (US); Stephen M. Gribble, Gloucestershire (GB); Philip M. Manrique, LaPorte, TX (US)

(73) Assignee: Teledyne Instruments, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,093

(22) Filed: Aug. 12, 2011

(65) Prior Publication Data
US 2011/0300308 A1    Dec. 8, 2011

Related U.S. Application Data

(62) Division of application No. 12/723,899, filed on Mar. 15, 2010, now Pat. No. 8,000,167, which is a division of application No. 12/005,075, filed on Dec. 21, 2007, now Pat. No. 7,710,819, which is a division of application No. 10/903,715, filed on Jul. 30, 2004, now Pat. No. 7,573,781.

(51) Int. Cl.
*G01V 1/38*    (2006.01)

(52) U.S. Cl.
USPC .............. 367/20; 367/15; 174/101.5

(58) Field of Classification Search
USPC ................... 367/20, 15; 174/101.5
See application file for complete search history.

(56) References Cited

U.S. PATENT DOCUMENTS 3,480,907 A    11/1969   King
3,518,677 A    6/1970   Florian
(Continued)

FOREIGN PATENT DOCUMENTS

AU    625782 B2    7/1992
AU    680489    7/1997
(Continued)

OTHER PUBLICATIONS

British Plastics Foundation, "Thermoplastic Elastomers RPE, TPR, TPV," 2003.
(Continued)

*Primary Examiner* — Mark Hellner
(74) *Attorney, Agent, or Firm* — K&L Gates LLP (57) ABSTRACT

The present invention relates to streamer cables. One embodiment of the present invention relates to a method for preparing a streamer cable. The method may comprise retrofitting the streamer cable with a solid void-filler material, where the streamer cable was configured as a liquid-filled streamer cable. The retrofitting may comprise introducing a void-filler material into the streamer cable when the void-filler material is in a liquid state and curing or otherwise solidifying the void-filler material to a solid state. In another embodiment, the present invention relates to a streamer cable comprising an outer skin and-at least one sensor positioned within the outer skin. The streamer cable may also comprise a solid void-filler material positioned between the outer skin and the at least one sensor, wherein the solid void-filler material is coupled to the at least one sensor.

20 Claims, 5 Drawing Sheets

U.S. PATENT DOCUMENTS

| | | |
|---|---|---|
| 3,531,760 A | 9/1970 | Whitfill |
| 3,696,329 A | 10/1972 | Hazelhurst |
| 3,713,085 A | 1/1973 | Laurent et al. |
| 3,739,326 A | 6/1973 | Kerr et al. |
| 3,744,016 A | 7/1973 | David |
| 3,893,065 A | 7/1975 | Lea et al. |
| 3,900,543 A | 8/1975 | Davis |
| 3,939,466 A | 2/1976 | Horwath |
| 3,978,446 A | 8/1976 | Miller |
| 4,011,540 A | 3/1977 | Farr |
| 4,063,215 A | 12/1977 | Abbott |
| 4,090,168 A | 5/1978 | Miller et al. |
| 4,125,823 A | 11/1978 | Hall, Jr. |
| 4,160,229 A | 7/1979 | McGough |
| 4,163,206 A | 7/1979 | Hall, Jr. |
| 4,204,188 A | 5/1980 | Weichart et al. |
| 4,296,481 A | 10/1981 | Weiss |
| 4,300,218 A | 11/1981 | Kruka et al. |
| 4,334,296 A | 6/1982 | Hall, Jr. |
| 4,464,739 A | 8/1984 | Moorcroft |
| 4,491,939 A | 1/1985 | Carpenter |
| 4,516,227 A | 5/1985 | Wener et al. |
| 4,536,862 A | 8/1985 | Sullivan et al. |
| 4,547,869 A | 10/1985 | Savit |
| 4,554,650 A | 11/1985 | Brown et al. |
| 4,631,711 A | 12/1986 | Fowler |
| 4,634,804 A | 1/1987 | Spalding |
| 4,649,530 A | 3/1987 | Porter, Jr. |
| 4,660,183 A | 4/1987 | McGowan et al. |
| 4,689,777 A | 8/1987 | Roever |
| 4,694,435 A | 9/1987 | Magneville |
| 4,733,378 A | 3/1988 | Pearce et al. |
| 4,789,968 A | 12/1988 | Rice |
| 4,798,853 A | 1/1989 | Handlin, Jr. |
| 4,821,241 A | 4/1989 | Berglund |
| 4,955,012 A | 9/1990 | Bledsoe |
| 4,958,329 A | 9/1990 | Marschall |
| 5,046,057 A | 9/1991 | Berni |
| 5,251,182 A | 10/1993 | Carpenter |
| 5,251,183 A | 10/1993 | McConnell et al. |
| 5,274,603 A | 12/1993 | Zibilich, Jr. et al. |
| 5,363,342 A | 11/1994 | Layton et al. |
| 5,367,497 A | 11/1994 | Marschall |
| 5,367,499 A | 11/1994 | Morningstar et al. |
| 5,381,382 A | 1/1995 | Marschall |
| 5,394,379 A | 2/1995 | Weichart |
| 5,400,298 A | 3/1995 | Hepp |
| 5,412,621 A | 5/1995 | Hepp |
| 5,459,695 A | 10/1995 | Manison |
| 5,521,885 A * | 5/1996 | Harvey .................. 367/154 |
| 5,523,983 A | 6/1996 | Morningstar et al. |
| 5,600,608 A | 2/1997 | Weiss et al. |
| 5,601,046 A | 2/1997 | Berglund |
| 5,606,329 A | 2/1997 | Ramotowski et al. |
| 5,646,470 A | 7/1997 | de Groot |
| 5,675,556 A | 10/1997 | Erath et al. |
| 5,742,562 A | 4/1998 | Marschall et al. |
| 5,745,436 A | 4/1998 | Bittleston |
| 5,777,954 A | 7/1998 | Hepp |
| 5,781,510 A | 7/1998 | Chang et al. |
| 5,784,337 A | 7/1998 | Rainey et al. |
| 5,789,844 A | 8/1998 | de Groot |
| 5,796,676 A | 8/1998 | Chang et al. |
| D401,516 S | 11/1998 | Dowle et al. |
| 5,867,451 A | 2/1999 | Chang et al. |
| 5,883,857 A | 3/1999 | Pearce |
| 5,943,293 A | 8/1999 | Luscombe et al. |
| 6,041,282 A | 3/2000 | Wardeberg et al. |
| 6,058,976 A | 5/2000 | Le Rossignol et al. |
| 6,108,267 A | 8/2000 | Pearce |
| 6,128,251 A | 10/2000 | Erath et al. |
| 6,154,420 A | 11/2000 | Norris |
| 6,160,762 A | 12/2000 | Luscombe et al. |
| 6,188,646 B1 | 2/2001 | Luscombe et al. |
| 6,262,375 B1 | 7/2001 | Engelhardt et al. |
| 6,262,944 B1 | 7/2001 | Meyer et al. |
| 6,477,111 B1 | 11/2002 | Lunde et al. |
| 6,498,769 B1 | 12/2002 | Pearce |
| 6,580,661 B1 | 6/2003 | Marschall et al. |
| 6,614,723 B2 | 9/2003 | Pearce et al. |
| 6,879,546 B2 | 4/2005 | Halvorsen et al. |
| 7,142,481 B1 | 11/2006 | Metzbower et al. |
| 7,239,577 B2 | 7/2007 | Tenghamm et al. |
| 7,573,781 B2 * | 8/2009 | Fernihough et al. ............ 367/20 |
| 7,710,819 B2 * | 5/2010 | Fernihough et al. ............ 367/20 |
| 8,000,167 B2 * | 8/2011 | Fernihough et al. ............ 367/20 |
| 2004/0017731 A1 | 1/2004 | Halvorsen et al. |
| 2006/0126432 A1 | 6/2006 | Hoogeveen |

FOREIGN PATENT DOCUMENTS

| | | | |
|---|---|---|---|
| EP | | 1033588 A2 | 9/2000 |
| EP | | 1123518 A1 | 8/2001 |
| EP | | 1148350 A1 | 10/2001 |
| WO | WO 93/17354 A1 | | 9/1993 |
| WO | WO 93/17356 A1 | | 9/1993 |
| WO | WO 95/35513 A1 | | 12/1995 |
| WO | WO 98/25437 A2 | | 6/1998 |
| WO | WO 99/60421 A1 | | 11/1999 |
| WO | WO 00/26695 A1 | | 5/2000 |
| WO | WO 01/79888 A1 | | 10/2001 |
| WO | WO 03/069635 A2 | | 8/2003 |

OTHER PUBLICATIONS

Plasticsusa.com, "TPU Thermoplastic Polyurethane" accessed Nov. 16, 2006.

Bidgood, D., "A Deep Towed Sea Bottom Profiling System," *Oceans,* vol. 6, pp. 96-107 (Aug. 1974).

"Marine Exploration Products", printed from http://www.teledyneinstruments.com/energy/marineexpir.asp on Oct. 21, 2004.

"Hydrophones", printed from http://www.teledyneinstruments.com/energy/hydrophones.asp on Oct. 21, 2004.

"Streamer Cables", printed from http://www.teledyneinstruments.com/energy/streamer.asp on Oct. 21, 2004.

Bowen, Adrian N. "High-Resolution Seismic Profiling System Using a Deep-Towed Horizontal Hydrophone Streamer," *Marine Geophysical Researches,* vol. 6, No. 3 pp. 275-293, (1984).

Berni, A.J., et al., "Evaluation of a Solid Hydrophone Cable," *IEEE Transactions on Sonics and Ultrasonics,* vol. Su-29, No. 6 (Jul. 1982).

Carr, P.B., "Sonars from the 60's and through the 90's", *IEE Colloquium* on "Education in Radar and Sonar", Digest No. 1992/022 (Jan. 1992).

Cooper, H. W., Cook, R.E., "Seismic Data Gathering," *Proceedings of the IEEE,* vol. 72, No. 10, pp. 1266-1275, (Oct. 1984).

Gilbert, D., "Seismic Streamer Position and Shape Estimation," *Oceans,* vol. 13, pp. 1077-1081, (Sep. 1981).

Grogan, M., "High Frequency Band Acoustic Positioning Equipment—Its Evolution and Integration with Other Systems," *Oceans,* vol. 19, pp. 357-361, (Sep. 1987).

Pedersen, E., "A Nautical Study of Towed Marine Seismic Streamer Cable Configurations," Universitetet Trondheim (Norway); vol. 58/03-C, pp. 1108 of *Dissertation Abstracts International* (1997).

Sack, P., Schuetzner, K., "Use of High Modulus Fiber Rapes in Large Scale Towed Marine Applications," *Oceans '99 MTS/IEEE, Riding the Crest into the 21st Century,* vol. 2, pp. 677-680, (1999).

Safar, M.H., "On the Equalization of the Transformerless Seismic Streamer Response" *Geophysical Prospecting,* Vo. 32, No. 2, pp. 228-235, (Apr. 1984).

Savoye, B.; Marsset, B.; De Roeck, Y.H.; Leon, P.; Lopes, L.; Herveou, J., "PASISAR: A New Tool for Near-Bottom Seismic Profiling in Deep Water," *Oceans '94; Oceans Engineering for Today's Technology and Tomorrow's Preservation.* Proceedings, vol. 1, pp. I-652-I-657, vol. 1, 13-16 (Sep. 1994).

Siems, Lee E., "Marine Seismic Digital Telemetry System," Offshore Technol. Conf. 12thAnnu, Proc., vol. 4 Houston, TX, May 5-8, 1980. Publ. By Offshore Technol. Conf., Dallas, Tex, 1980 Pap OTC 3917, pp. 617-626, (1980).

van der Veen, M., et al. "Design and Application of a Towed Land-Streamer System for Cost-Effective 2-D and Pseudo-3-D Shallow Seismic Data Acquisition", *Geophysics,* vol. 66, Issue 2, pp. 482-500, (Mar.-Apr. 2001).

Milburn, D., et al., "A Steady-State Analysis of Candidate Towing Cables for a Deep-Towed Geophysical Array System (Technical Note)," Naval Ocean Research and Development Activity, NSTL Station, MS. Report No. NORDA-TN-40, (Mar. 1979).

"Development of Septon™ V Series", printed from http://www.septon.info/en/news/sub/02feb04.html on Jul. 20, 2004.

"Acquisition of Multi-Component Seafloor Seismic", printed from http://www.pgs.com/technologynow/aquisition/dbaFile7484.html, on May 20, 2004.

"The Past, Present and Future of Ocean Bottom Seismic Systems", printed from http://www.worldoil.com/magazine/MAGAZINE_DETAIL.asp?AT_ID=18843&MONT . . . on May 20, 2004.

Odian, G., *Principles of Polymerization*, John Wiley & Sons, Inc., 1991, pp. 24-33.

MatWeb, The Online Materials Database Overview—Silicone, RTV, Adhesive/Sealant Grade Printed from http://www.matweb.com/search/SpecificMaterialPrint.asp?bassnum=O5200, Sep. 19, 2007, 2 pages.

MatWeb, The Online Materials Database Overview—Silicone, RTV, Encapsulation Grade Printed from http://www.matweb.com/search/SpecificMaterialPrint.asp?bassnum=O5201, Sep. 19, 2007, 3 pages.

PRC-DeSoto International, Technical Data, PR-1535, Potting and Molding Compound, Feb. 1999, 2 pages.

Products Research Company, Technical Data Sheet, PR-720 and PR-720-T, May 1965, 3 pages.

International Search Report and Written Opinion, PCT/US05/26536, Aug. 22, 2006.

European Search Report, 05 25 4576, Oct. 5, 2007.

Singapore Examination Report for Application No. SG 200504718-8.

Singapore Written Opinion and Search Report for Application No. SG 200504718-8.

Non-Final Office Action for U.S. Appl. No, 10/903,716 issued Sep. 28, 2005.

Non-Final Office Action for U.S. Appl. No. 10/903,715, issued Mar. 2, 2006.

Non-Final Office Action for U.S. Appl. No. 10/903,715, issued Jun. 14, 2006.

Final Office Action for U.S. Appl. No. 10/903,715, issued Nov. 20, 2006.

Non-Final Office Action for U.S. Appl. No. 10/903,715, issued Jun. 8, 2007.

Final Office Action for U.S. Appl. No. 10/903,715, issued Mar. 6, 2008.

Interview Summary for U.S. Appl. No. 10/903,715 issued May 8, 2008.

Non-Final Office Action for U.S. Appl. No. 10/903,715, issued Jul. 30, 2008.

Interview Summary for U.S. Appl. No. 10/903,715 issued Feb. 2, 2009.

Notice of Allowance for U.S. Appl. No. 10/903,715 issued Jun. 4, 2009.

Non-Final Office Action for U.S. Appl. No. 12/005,075 issued Nov. 13, 2008.

Non-Final Office Action for U.S. Appl. No. 12/005,075 issued Apr. 28, 2009.

Interview Summary for U.S. Appl. No. 12/005,075 issued Aug. 20, 2009.

Notice of Allowance for U.S. Appl. No. 12/005,075 issued Dec. 14, 2009.

Non-Final Office Action for U.S. Appl. No. 12/723,899 issued Jun. 10, 2010.

Final Office Action for U.S. Appl. No. 12/723,899 issued Dec. 6, 2010.

Interview Summary for U.S. Appl. No. 12/723,899 issued Apr. 15, 2011.

Notice of Allowance for U.S. Appl. No. 12/723,899 issued Apr. 15, 2011.

International Preliminary Report on Patentability, PCT/US05/26536, Jan. 30, 2007.

Extended European Search Report, 10185757.1, Aug. 1, 2012.

* cited by examiner

STREAMER CABLE WITH ENHANCED PROPERTIES

This application is a divisional of U.S. patent application Ser. No. 12/723,899, filed on Mar. 15, 2010, now allowed, which is incorporated herein by reference in its entirety and is a divisional of U.S. patent application Ser. No. 12/005,075, filed on Dec. 21, 2007, now issued as U.S. Pat. No. 7,710,819, which is incorporated herein by reference in its entirety and is a divisional of U.S. patent application Ser. No. 10/903,715, filed on Jul. 30, 2004, now issued as U.S. Pat. No. 7,573,781, which is also incorporated herein by reference in its entirety.

FIELD OF TECHNOLOGY

This invention relates to improvements to streamer cables, and methods of retrofitting and producing streamer cables. More specifically, the invention relates to streamer cables with solid void-filler materials, and methods of retrofitting streamer cables configured as liquid-filled streamer cables with a solid void-filler material.

BACKGROUND OF THE TECHNOLOGY

Streamer cables are used in a variety of applications, usually involving remote sensing in water environments, for example, in fresh or saltwater bodies. The cables are typically used for seismic exploration surveys to gather information about subsurface geology, including oil and gas reserves. The cables usually contain one or more sensors for receiving signals present in the water. Often, the sensors include hydrophones for sensing acoustic signals. Individual streamer cables are often made up of a series of sections, which may be on the order of 75 meters long. In deployment, streamer cables, or arrays of several streamer cables, may be towed behind vessels, or deposited at fixed locations, such as ocean floor locations.

In a typical seismic exploration survey, one or more streamer cables are towed behind a tow vessel. The one or more streamer cables often form an array that may include a dozen or more parallel cables, each many kilometers in length. The tow vessel, or another vessel, may include an acoustic source for generating acoustic signals. The acoustic signals propagate through the water and interact with various structures in the water, on the ocean floor, and/or below the ocean floor. The interactions may produce reflections and/or refractions that may be sensed by the streamer cables and used to generate information about the reflecting or refracting structures. For example, an energy company may be able to locate areas beneath the ocean floor that are more likely to contain deposits of oil, gas and/or other minerals by examining the information developed from the acoustic reflections and/or refractions received by hydrophone sensors contained within a streamer cable. Often the acoustic signals used in seismic surveys are of a very low frequency, for example, between 3 and 150 Hz.

Streamer cables may also be used in other applications, such as surveillance applications. In some applications, one or more streamer cables are referred to as towed arrays. In an example surveillance application, a military vessel may tow or deposit a streamer cable containing sensors capable of detecting, for example, the noise generated by other vessels. Streamer cables in such surveillance applications may be capable of sensing acoustic energy over a much broader bandwidth than the 3-150 Hz frequency range discussed above.

Conventional streamer cables are liquid-filled. Liquid-filled streamer cables typically include an outer skin that houses the components of the cable including, sensors, strength members, wires, etc. After the streamer cable is configured, a liquid void-filler material, for example kerosene, is added to fill the void between the outer skin and the sensors, strength members, etc. The liquid void-filler typically provides acoustic coupling between the outer skin and the sensors. The specific liquid void filler material may be selected to adjust the overall density of the streamer cable and therefore affect its buoyancy.

Although they are widely used, liquid-filled streamer cables present several difficulties. First, because the liquid void-filler material may be mobile within the outer skin, mechanical energy resulting from the movement of the cable, tow vessel, and cable handling devices in the water may be acoustically coupled to the sensors by bulge waves in the cable. Additionally, the liquid void filler of liquid-filled cables may leak into the body of water when the outer skin is damaged. A liquid void-filler, such as kerosene may create an environmental hazard when leaked into a body of water. Also, leaked liquid void filler may be replaced in the streamer cable by water, which can degrade received signals and cause corrosion of the internal components of the streamer cable, especially in saltwater environments. As such, many energy companies and other users of streamer cables have begun to favor alternatives to liquid-filled streamer cables.

Solid streamer cables, i.e. streamer cables with solid void-fillers, have been developed in an attempt to address the problems of liquid-filled streamer cables. A common type of solid streamer cable includes a solid central core with sensors, skin, buoyant material, and other various components installed thereabout. Another type of solid streamer cable includes alternating sections of sensors and buoyant material. As an alternative to liquid-filled cables, solid streamer cables have superior leakage and bulge wave reduction qualities, but present other difficulties of their own.

For example, solid streamer cables suffer various problems related to buoyancy. The solid core and other solid materials in the cables typically have a density greater than that of seawater. Therefore, additional buoyant material, often hollow microbead material made of glass or foam, is placed in the streamer cable to reduce its overall density. Because the density of the microbead material is related to the quantity of air positioned within the microbeads, insuring consistent density throughout the microbead material may be costly and complicated.

Also, microbead material made of glass or foam tends to crush when subjected to excessive force, causing the overall density of the streamer cable to increase, and causing a loss of buoyancy. For example, if a solid streamer cable is handled roughly, or coiled at a small radius, microbead material may be crushed. Often tow vessels outfitted to handle and store liquid-filled cables must be refitted with new handling equipment, including coiling spools, etc., before the vessels may safely handle solid cables. Microbead material may also be crushed by water pressure if the streamer cable is operated beyond a certain depth. In extreme situations, solid cables with crushed microbead material may lose considerable buoyancy, and sink beyond recovery.

Solid streamer cables also suffer from noise problems due to shear wave energy. Because the solid materials in existing solid streamer cables, including glass microbead materials, have low compliance, energy from the motion of the cable in the water can be coupled through the solid materials to the sensors in the form of shear waves. Isolating the sensors from the shear waves presents a considerable challenge. Often, the sensors are placed in a rigid isolation structure or housing embedded in the solid void-filler material. The structure or housing may then be filled with a liquid void-filler for providing the necessary acoustic properties and negating the negative properties of the solid void-filler. Conventional streamer cables with liquid void-filler material typically do not contain such isolation structures for sensors. It can be appreciated that the necessity of isolating sensors within a cable, such as with isolation structures, adds complexity and expense, and also limits the potential configurations of the sensors and types of sensors that may be installed within the streamer cable.

Repairing existing solid streamer cables may also present certain difficulties. For example, it may be necessary to remove large sections of solid material to access damaged sensors or signal wire. It can be seen that replacing the sections of solid material of existing solid streamer cables without adversely affecting the signal qualities of the cable presents a considerable challenge.

Accordingly, there is a need for a streamer cable with a void-filler material that remains largely confined to the cable in the event of a failure of the outer skin. Also, there is a need for a solid void-filler material for retrofitting existing liquid-filled streamer cables. There is also a need for a streamer cable with a void-filler material that does not couple excessive shear wave or bulge wave energy to the sensors of a streamer cable.

SUMMARY OF THE INVENTION

One embodiment of the present invention relates to a method for preparing a streamer cable. The method may comprise retrofitting the streamer cable with a solid void-filler material, wherein the streamer cable was configured as a liquid-filled streamer cable. The retrofitting may comprise introducing a void-filler material into the streamer cable when the void-filler material is in a liquid state and curing or otherwise solidifying the void-filler material to a solid state.

Another embodiment of the present invention relates to a streamer cable. The streamer cable may comprise an outer skin and at least one sensor positioned within the outer skin. The streamer cable may also comprise a solid void-filler material positioned between the outer skin and the at least one sensor, wherein the solid void-filler material is coupled to the at least one sensor.

A further embodiment of the present invention relates to a method for preparing a streamer cable. The method may comprise introducing an additive into the streamer cable and introducing a gel concentrate into the streamer cable. The method may also comprise solidifying the gel concentrate and the additive.

Yet another embodiment of the present invention relates to a method of performing maintenance on a streamer cable. The method may comprise changing the state of a void-filler material within the streamer cable from a solid state to a liquid state and removing a portion of the void-filler material from the streamer cable. In various embodiments, the method may also comprise performing a maintenance operation on the streamer cable, or simply replacing the void-filler material.

A further embodiment of the present invention relates to a method of preparing a streamer cable. The method may comprise introducing a void filler material into the streamer cable, where the void-filler material is in a liquid state, and curing the void-filler material to a solid state.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The reader will appreciate the foregoing details and advantages of the present invention, as well as others, upon consideration of the following detailed description of embodiments of the invention. The reader also may comprehend such additional details and advantages of the present invention upon making and/or using embodiments within the present invention.

BRIEF DESCRIPTION OF THE FIGURES

The features and advantages of the present invention may be better understood by reference to the accompanying figures in which.

DESCRIPTION ON THE INVENTION

Embodiments of the present invention relate to streamer cables, solid void-filler material for streamer cables, methods of retrofitting streamer cables configured for liquid void-filler materials, methods of making streamer cables, and methods of maintaining streamer cables. Embodiments of the apparatus and methods of the present invention may combine the benefits of existing solid and liquid-filled streamer cables including, for example, minimizing the environmental concerns associated with liquid-filled streamer cables, without incorporating all of the problems of existing solid and liquid-filled streamer cables.

Figure 1:
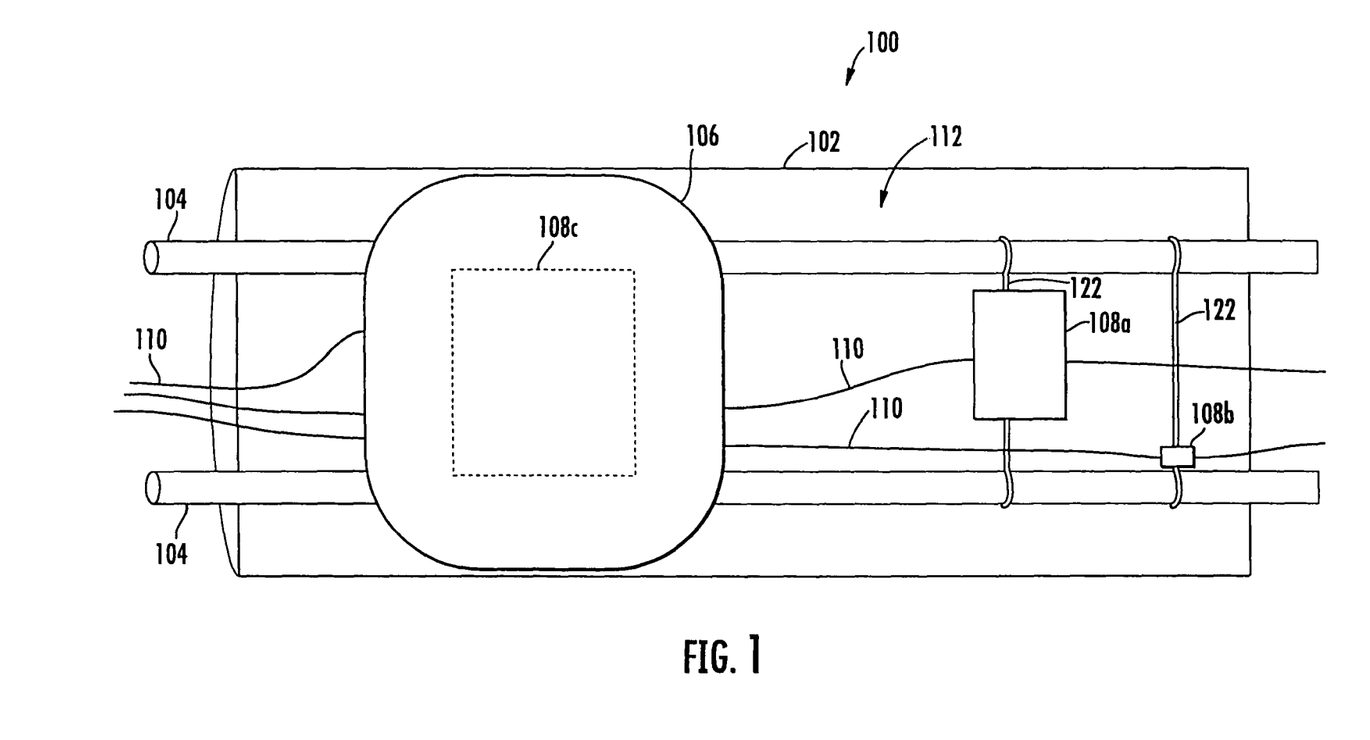
FIG. 1 is a simplified cross-sectional diagram of a section of streamer cable according to various embodiments of the present invention.

FIG. 1 is a cross-sectional diagram of a section of streamer cable 100 according to various embodiments of the present invention. An outer skin 102 may enclose the streamer cable 100 and surround the sensors 108 and any other internal components, as discussed below. The outer skin 102 may be watertight to prevent outside water from contacting the sensors 108 and other components of the streamer cable 100. In various embodiments, the outer skin 102 may be made of materials known in the art including, for example, polymeric materials. One or more strength members 104 within the outer skin 102 may provide the streamer cable 100 with strength as well as secure components at locations within the streamer cable 100. In various embodiments, strength members 104 may be cables made of fiber, synthetic materials, wire, etc.

Sensors 108 may include various kinds of transducers and/or other instruments for measuring signals incident on the streamer cable 100. In various embodiments, one or more of the sensors 108 may be a hydrophone for sensing acoustic signals. Other types of sensors 108 may also be used including, for example, directional sensors, magnetic sensors, temperature sensors, pressure sensors, etc. The sensors 108 may transmit received signal information according to various transmission methods including, for example, electrical or optical methods. Wires 110 may transmit the received signal information and may be, for example, electrical signal wires, fiber optic cables, etc.

Sensors 108 may be secured within the streamer cable 100 by mounting mechanisms 122 and/or bulkheads 106, and may be positioned at any practical interval, position, or orientation within the outer skin 102 of the streamer cable 100 including, for example, the positions shown by sensors 108*a*, 108*b*, and 108*c*. Mounting mechanisms 122 may be made of wire, cable, or any other suitable material and may secure sensors 108*a* and 108*b* to strength members 104 using tie-wraps, for example. In some embodiments, mounting mechanisms 122 may include a sleeve (not shown) for enclosing the sensors 108*a* and 108*b*, and may be made of various materials including, for example, plasticized PVC, nylon, etc.

Figure 1A:
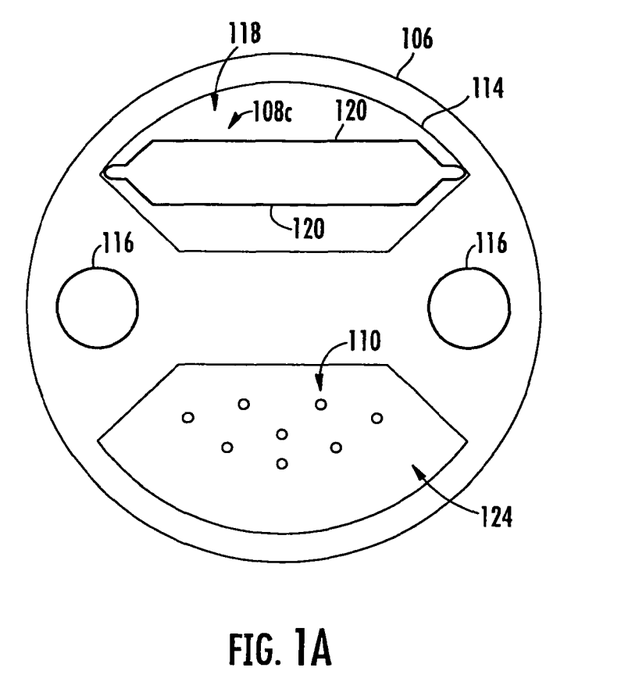
FIG. 1A is a diagram of a bulkhead according to various embodiments of the present invention.

FIG. 1A shows a view of a bulkhead 106 according to various embodiments of the present invention. The bulkhead 106 may be made of any suitable material including, for example, plastic or other suitable material. Cavities 116 in the bulkhead 106 may be used to secure the bulkhead 106 to the strength members 104 of the streamer cable 100. Cavity 124 may contain the wires 110 discussed above. Cavity 118 may house a sensor 108*c*, with active surfaces 120. Active surfaces 120 may be the portion or portions of a sensor 108 that are sensitive to signals. In various embodiments, cavity spaces within the bulkhead 106 that are not otherwise filled may include the void-filler material 112.

Referring back to FIG. 1, void-filler material 112 may be positioned between the outer skin 102 and the various other components of the streamer cable 100. The void-filler material 112 may be solid during operation of the streamer cable 100. This may prevent the void-filler material 112 from leaking into the environment surrounding the streamer cable 100 in the event of a tear or other failure of the outer skin 102.

The void-filler material 112 may be coupled to the sensors 108. Coupling may include placing the void-filler material 112 and the sensors 108 in sufficient contact such that signals propagating through the void-filler material 112 are received by the sensors 108. The signals may include acoustic signals, thermal signals, pressure signals, etc. It can be appreciated that coupling may be enhanced by placing the void-filler material 112 in direct physical contact with the sensors 108, and/or with active surfaces 120 of the sensors 108. In various embodiments, this may be accomplished by filling the streamer cable with liquid material that is then solidified around the sensor. It can be appreciated that this method may easily accommodate many sensor 108 configurations, sizes, shapes, etc. It may also facilitate encapsulating the sensors 108 with void-filler material 112, e.g. positioning the void-filler material 112 to substantially surround or encapsulate at least one active surface 120 of the sensors 108.

The void-filler material 112 may be made of any suitable solid material that couples incident signals, such as acoustic signals, to the sensors 108 without also coupling excessive noise. Suitable void-filler materials 112 may be essentially incompressible and suitably compliant. An essentially incompressible material, for example, may undergo a minimal change in volume when subjected to a change in pressure. Therefore, an essentially incompressible void-filler material 112 may couple pressure changes, for example, due to acoustic waves, to the sensors 108 rather than absorbing the pressure changes with a change in volume. An essentially incompressible material may be characterized by a relatively high bulk modulus similar, for example, to that of kerosene.

A suitably compliant material may not couple excessive shear noise to the sensors 108. Materials with a low compliance may not deform appreciably in response to shear energy. Therefore, shear energy incident on a low compliance material may be coupled through the material, for example, to a sensor 108. It can be appreciated that solid materials are generally of a lower compliance than liquid materials, such as kerosene. Nonetheless, a solid void-filler material 112 may be chosen with a high enough compliance that the level of shear noise coupled to the sensors 108 is low enough for the streamer cable 100 to be useful in seismic survey and other applications. In certain embodiments, it may be advantageous to choose a solid void-filler material 112 with a compliance such that the level of shear noise coupled to the sensors 108 is below the noise floor generated by other ambient signals in the ocean or other body of water. Other applications, however, favor a more rigid, less compliant void-filler material 112, even at the expense of slightly increased noise.

Examples of suitable solid materials for void-filler materials 112 may include polymers, such as, for example, polymer gels, cross-linked polymers, thermoset polymers, thermoplastic polymers, photopolymers, multi-component resins, etc. The polymers may be homopolymers, copolymers, graft polymers, block copolymers, random copolymers or any other polymer topology. Specific polymers that may be used in void-filler material 112, alone or in combination, may include polymers prepared from isoprene, styrene, ethylene, propylene, butylene, urethanes, butadiene, acrylates, or derivations of such monomers. In certain embodiments, void-filler may comprise a thermoplastic rubber including a series of hydrogenated styrenic block copolymers.

In various embodiments, solid void-filler material 112 may be installed into streamer cables 100 designed to include the solid void-filler material 112. It is also important to note that streamer cables 100 that were originally configured as liquid-filled streamer cables may be retrofitted to include the solid void-filler material 112 of the present invention for at least the reason that the solid void-filler material 112, or constituent parts thereof, may be added to the streamer cable in at least a partially liquid state. This allows the void filler material 112 to flow around the sensors and other components. Void-filler material 112 may be introduced into either a new-design streamer cable or a streamer cable configured as a liquid-filled streamer cable according to various methods, for example, those set out below.

The void-filler material 112 or constituent parts thereof, may be introduced into the streamer cable 100 in a liquid state and then cured to a solid state. In various embodiments, a void-filler material 112 may be considered to be in a solid state when at least a portion of the material displays characteristics similar to those of a crystalline solid. For a detailed discussion of the physical states of a polymer, see George Odian, *Principles of Polymerization*, 24-33 (John Wiley & Sons, Inc.) (1991), which is incorporated herein by reference. In various embodiments, the void-filler material 112 may be made of materials other than polymers.

Figure 2:
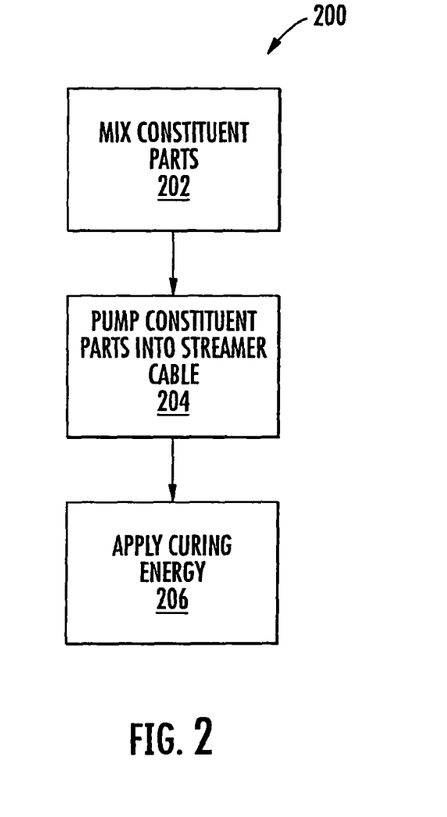
FIG. 2 is a flow chart of a method for installing void-filler material into a streamer cable according to various embodiments of the present invention.

FIG. 2 is a flowchart of a process flow 200 for installing a void-filler material 112 into a streamer cable 100 according to various embodiments of the present invention. At step 202, constituent parts of the void-filler material 112 may be mixed together. The constituent parts may include, for example, the components of a multi-component resin and/or a gel concentrate. The constituent parts may also include one or more property modifying agents. Property modifying agents may include, for example, plasticizers and tackifiers. A plasticizer may affect, for example, the compliance, density, buoyancy, overall weight, etc. of the void-filler material 112. A tackifier may affect, for example, the elasticity, etc. of the void-filler material 112. The constituent parts may also include other additives including, for example, oil. In various embodiments, the mixture of constituent parts may be heated.

At step 204, the constituent parts may be pumped into the streamer cable 100. The constituent parts may be in a liquid state to facilitate pumping. At step 206, the constituent parts may be subjected to curing energy. Curing energy may cause the constituent parts to cure into a solid state having favorable properties as a void-filler material 112. Curing energy may be, for example, in the form of heat energy, or light energy, such as ultraviolet light. Also, curing energy may be in the form of chemical energy provided by introducing a reactive agent, or a cross-linking agent to the constituent parts. The curing energy may cause, for example, one or more chemical reactions between one or more of the constituent parts. In various embodiments, the one or more chemical reactions may cross-link the molecules of the void-filler material 112. In embodiments where the constituent parts were heated prior to being pumped into the streamer cable 100, curing may be alternatively facilitated by cooling the constituent parts within the streamer cable 100.

In various embodiments, curing reactions may be made insensitive to moisture and other environmental factors. For example, various constituent parts may react more readily with water than with the other constituent parts. When only a small amount of a water-sensitive constituent part is required, the entire quantity of the constituent part provided may be consumed in a reaction with water or water vapor in the environment, leaving none for curing reactions. This problem may be overcome by providing a large enough quantity of water-sensitive constituent parts to allow a reaction with water in the environment as well as sufficient reactions with the other constituent parts in the curing reactions.

Figure 3:
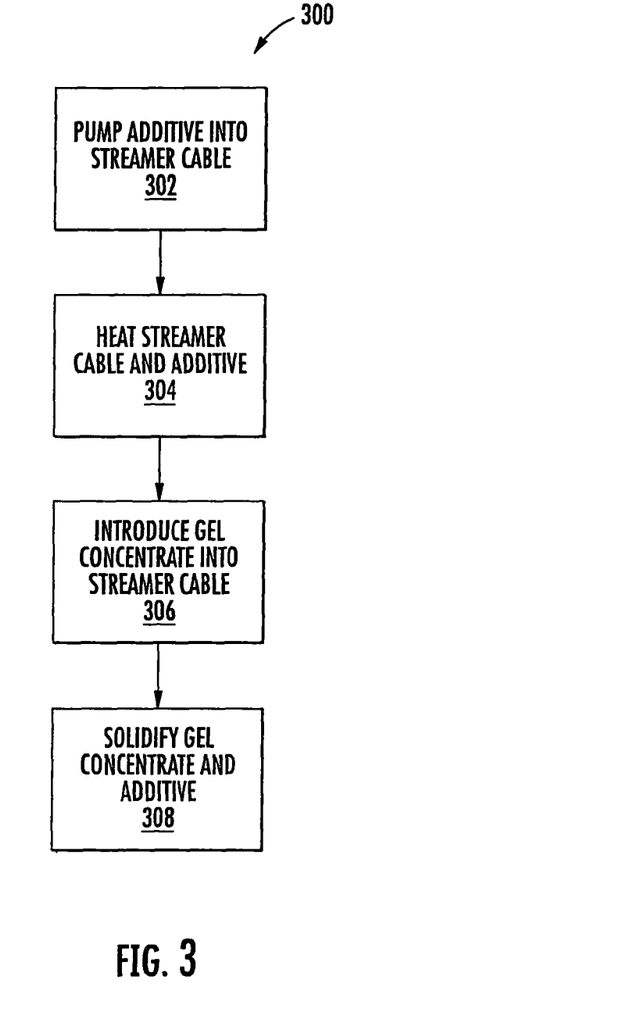
FIG. 3 is a flow chart of a method for installing void-filler material into a streamer cable according to various embodiments of the present invention.

FIG. 3 is a flowchart of an additional process flow 300 for installing a void-filler material 112 into a streamer cable 100 according to various embodiments of the present invention. Again, the streamer cable 100 may be a new-design cable or a cable configured as a liquid-filled streamer cable being retrofitted with a solid void-filler material 112 according to the present invention.

At step 302, an additive may be pumped into the streamer cable 100. The additive may be any constituent part of the void-filler material 112, and may constitute various percentages of the completed void-filler material 112 by weight, volume, etc. For example, in various embodiments, the additive may make up more than 50% of the void-filler material 112 by weight, volume, etc. Additives may include, for example, oil, water, other solvents, and/or property modifying agents such as tackifiers and plasticizers. Additives, for example, oil additives, may be chosen for their compatibility with the void-filler material 112 and their overall density. Examples of oil additives may include oil hot-melts such as isomerized oils, iso parafins, α-olefins naphthenic oils, and/or other proprietary streamer oils, etc.

At step 304, the streamer cable and additive may be heated, for example, above the solidification temperature of the final void-filler material 112. The solidification temperature of the void-filler material 112 may be the temperature at which the void-filler material 112 transitions to or from a solid state. In various embodiments, the heating may be accomplished by immersing the streamer cable 100, constituent parts of the void-filler material 112, and equipment used to handle the cable and constituent parts, such as pumps, reservoirs, etc., in a hot water bath.

At step 306, gel concentrate may be introduced into the streamer cable. In some embodiments, the gel concentrate may be introduced by connecting the streamer cable 100 containing the additive to a reservoir containing the gel concentrate, for example, by opening a valve. The gel concentrate in the reservoir may be in a liquid state as a result of heating the reservoir above the solidification temperature at step 304. The additive may be circulated through the streamer cable 100 and the reservoir until a desired concentration of the gel concentrate is present in the streamer cable 100.

In other embodiments, gel concentrate may be introduced into the streamer cable 100 by other means. For example, extruded strands of solid gel concentrate may be included in the streamer cable 100. The extruded strands may be woven into strength members 104 or through cavities 118, 124, 116, of bulkheads 106. In some embodiments, injection molded capsules or other shapes of gel concentrate may be included in the streamer cable during its initial manufacture. It can be appreciated that upon the heating of the streamer cable 100 and additive at step 304, gel concentrate contained in extruded strands and/or other solid capsules or shapes may liquefy. The now-liquid gel concentrate may be dispersed in the streamer cable to a desired and/or uniform consistency according to methods known in the art including, for example, fluid circulation, agitation, etc.

When a desired concentration is reached, the additive and gel concentrate may be cured or otherwise solidified at step 308. The curing may involve, for example, subjecting the cable to curing energy, or cooling the streamer cable 100 and void-filler material 112 below the solidification temperature of the void-filler material 112.

In order to facilitate maintenance of a streamer cable 100, void-filler material 112 may be capable of transitioning from a solid state to a liquid state on the application of energy. For example, the void-filler material 112 may be a thermoplastic polymer that transitions from a solid state to a liquid state at a solidification temperature. In various embodiments, the solidification temperature may be chosen above the highest expected operating, handling, and storage temperature of the streamer cable 100. For example, the void-filler material 112 may have a solidification temperature between 60° and 100° centigrade. In various embodiments, the solidification temperature of the void-filler material 112 may be between 70° and 80° centigrade. Transitioning the void-filler material 112 from a solid to a liquid may facilitate maintenance of the streamer cable 100 by allowing the removal of at least a portion of the void-filler material 112.

Figure 4:
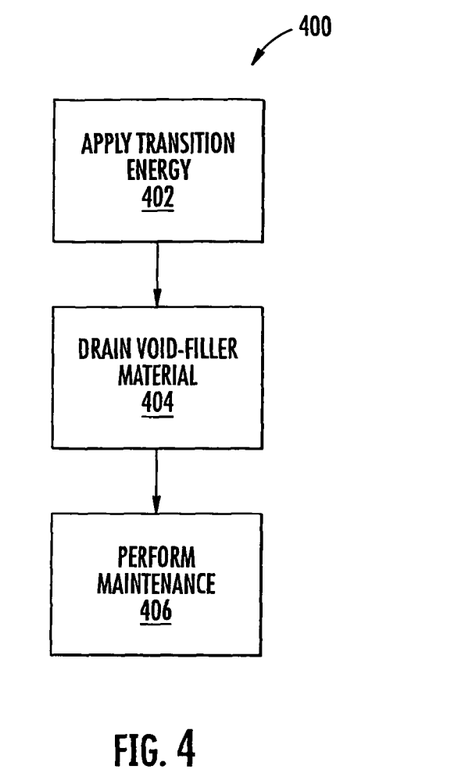
FIG. 4 is a flow chart of a method for maintaining a streamer cable according to various embodiments of the present invention.

FIG. 4 is a flowchart of a process flow 400 for performing maintenance on a streamer cable 100 containing void-filler material 112 according to various embodiments of the present invention. At step 402, transition energy may be applied to the streamer cable 100, causing the void-filler material 112 to transition from a solid to a liquid. For example, if the void-filler material 112 is a thermoplastic polymer, the energy may cause the temperature of the void-filler material 112 to rise above a solidification temperature. In some embodiments, transition energy may be applied by placing the streamer cable 100 in a hot water bath. At step 404, all or a portion of the now-liquid void-filler material 112 may be drained or pumped from the streamer cable 100. In some embodiments, the outer skin 102 of the streamer cable may be removed prior to applying transition energy. This may obviate the need to drain the streamer cable 100 at step 404.

After the void-filler material 112 has been removed, a maintenance operation may be performed on the streamer cable 100 at step 406. A maintenance operation may include, for example, fixing or replacing a component of the streamer cable 100, or simply replacing the void-filler material 112.

In various embodiments, the void-filler material 112 may be chosen with additional properties to increase its quality for use in specific applications of a streamer cable 100. For example, the mobility, wave transmission properties, density, elasticity, coefficient of volumetric thermal expansion, flashpoint, etc. of the void-filler material 112 may be optimized to increase its usefulness.

A void-filler material 112 with appropriate mobility may enhance the signals received by the streamer cable 100 by reducing noise. If the void-filler material 112 is overly mobile, the streamer cable 100 may transmit bulge waves in response to forces incident on the streamer cable 100 due to the motion of the cable and the tow vessel. Bulge waves propagated in a streamer cable 100 may be coupled to the sensors 108, causing noise in the information generated by the sensors 108 or other components. A particular streamer cable 100 may facilitate the propagation of bulge waves only at certain frequency modes. The frequencies of the modes may depend on the mobility of the void-filler material 112 and the elasticity of the outer skin 102. Acoustic noise due to bulge waves may be minimized by choosing the mobility of the void-filler material 112 and the elasticity of the outer skin 102 such that none of the frequency modes of the streamer cable 100 fall within the signal frequencies to be measured by the streamer cable 100.

Wave transmission properties of the void-filler material 112 may be considered to ensure effective coupling, for example, when the streamer cable 100 is used in a high-frequency application, such as military surveillance. The void-filler material 112 may be chosen with acoustic impedance close to that of the water outside the cable. Acoustic impedance is a measure of the ease with which acoustic energy may propagate through a material. Choosing the void-filler material 112 with acoustic impedance similar to that of the outside water may allow a greater percentage of high frequency acoustic energy incident on the streamer cable 100 to be coupled to the sensors 108 rather than reflected. Accordingly, the void-filler material 112 may have an acoustic impedance between 1 and 2 mega-Rayls or about 1.5 mega-Rayls.

The void-filler material 112 may be chosen with a density to affect the density, and thus the buoyancy, of the streamer cable 100. It may be desirable for a streamer cable 100 to have a density roughly equal to that of seawater, e.g. neutral buoyancy, to facilitate operation at various depths. In various embodiments, the streamer cable 100, absent the void-filler material 112, may have a density greater than that of seawater. In that case, the void-filler material 112 may be chosen with a density less than that of seawater to make the overall density of the streamer cable roughly equal to that of seawater. In various embodiments, the density of the void-filler material 112 may be manipulated by embedding solid filler units of varying densities within the void-filler material 112. For example, if the density of the void-filler material 112 is to be lowered, then filler units with relatively low densities may be embedded, such as microbeads or foams.

Also, in various embodiments, a void-filler material 112 with a high elasticity may be chosen. A void-filler material with a high elasticity may be more likely to resume its original shape after being deformed by stress. Thus an elastic void-filler material 112 may be, for example, more likely to remain in the streamer cable 100 in the event of a failure of the outer skin 102.

The void-filler material 112 may be chosen with properties that enhance the streamer cable's 100 consistency of performance over an expected range of operating temperatures. A typical streamer cable 100 may operate in ambient water temperatures between −5° and 40° centigrade, and may be stored and handled in temperatures between −20° centigrade and 60° centigrade. It can be appreciated that should the compliance, compressibility, mobility, etc. of the void-filler 112 change, signal quality may not remain consistent. As such, it may be desirable to choose a void-filler material 112 whose properties remain constant, or at least allow the streamer cable 100 to remain operative, over the expected ambient water temperature range, or even over the entire expected storage and handling temperature range.

In certain embodiments, for example when the void-filler material 112 includes a polymer, choosing a material with an appropriate crystalline melting temperature and glass transition temperature may enhance its consistency. For example, a material may be chosen with a crystalline melting temperature above the highest expected operating temperature of the streamer cable 100, for example 60° centigrade, and a glass transition temperature below the lowest expecting operating temperature, for example, −20° centigrade.

In certain embodiments, output consistency may also be enhanced by choosing a void-filler material 112 with a relatively small coefficient of volumetric thermal expansion, for example less than 0.002 per degree centigrade. In some embodiments, the coefficient of volumetric thermal expansion of the void-filler material 112 may be 0.001 per degree centigrade. It can be appreciated that excessive changes in the void-filler material's 112 volume may cause unwanted changes in buoyancy. Therefore, it may be desirable to select a void-filler material 112 with a low coefficient of volumetric thermal expansion.

The flashpoint of the void-filler material 112 may affect how the gel can be shipped. Some shipping companies and/or regulatory bodies require special accommodations, and additional expense, to ship materials with a flashpoint below a certain threshold. For example, some shipping companies will not ship a material with a flashpoint below 77° centigrade without special accommodations. As such, it may be desirable to choose the void-filler material 112 with a flashpoint above 77° centigrade. In various embodiments, the void-filler material 112 may have a flashpoint of between 77° and 150° centigrade.

It is to be understood that the present description illustrates those aspects of the invention relevant to a clear understanding of the invention. Certain aspects of the invention that would be apparent to those of ordinary skill in the art and that, therefore, would not facilitate a better understanding of the invention, such as for example, various spacers, connectors, etc. and other components of streamer cables, have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

What is claimed is:
1. A method of preparing a streamer cable, comprising:
    introducing a void-filler material into a streamer cable, wherein the void-filler material is in a liquid state; and
    curing the void-filler material to a solid state, wherein the void-filler material, when in the solid state, has a mobility that causes the streamer cable to shift substantially all bulge wave energy outside of a desired signal frequency range and wherein the void-filler material is coupled to at least one sensor.

2. The method of claim 1, wherein the streamer cable comprises at least one sensor.

3. The method of claim 1, further comprising introducing a property modifying agent into the streamer cable.

4. The method of claim 1, wherein the property modifying agent is at least one of a plasticizer, a tackifier, and a crosslinking agent.

5. The method of claim 1, further comprising: mixing a combination of constituent parts of a void-filler material; and heating the combination.

6. The method of claim 1, wherein the curing comprises exposing the void-filler material to light energy.

7. The method of claim 6, wherein the light energy comprises ultraviolet energy.

8. The method of claim 1, wherein the curing comprises heating the void-filler material.

9. The method of claim 1, wherein the curing comprises cooling the void-filler material.

10. The method of claim 1, wherein the curing comprises crosslinking the void-filler material.

11. The method of claim 1, wherein the curing comprises introducing a reactive agent to the void-filler material.

12. The method of claim 1, wherein the streamer cable further comprises a plurality of strength members, wherein all of the plurality of strength members are offset from a central axis of the streamer cable.

13. The method of claim 1, wherein the streamer cable comprises: an outer skin, and at least one sensor positioned within the outer skin, and wherein introducing the void-filler into the streamer cable comprises introducing the void-filler into an area between the outer skin and the at least one sensor.

14. The method of claim 13, wherein the at least one sensor is at least one of a directional sensor, a temperature sensor, a hydrophone, and a magnetic sensor.

15. The method of claim 13, wherein the at least one sensor comprises a sensor positioned at about the center axis of the streamer cable.

16. The method of claim 13, wherein the void-filler material at least partially encapsulates the at least one sensor.

17. The method of claim 13, wherein, upon curing, the void-filler material has a density lower than the density of seawater.

18. The method of claim 13, wherein, upon curing, the void-filler material is essentially incompressible.

19. The method of claim 1, wherein the void-filler material comprises a thermoplastic polymer.

20. The method of claim 1, wherein the void-filler material has a solidification temperature between 60° and 100° centigrade.

* * * * *